United States Patent
Simons et al.

(10) Patent No.: US 10,778,051 B2
(45) Date of Patent: Sep. 15, 2020

(54) ROTOR ASSEMBLY MANUFACTURING TECHNIQUE

(71) Applicant: Atieva, Inc., Newark, CA (US)

(72) Inventors: Stephen W. Simons, Los Altos, CA (US); Jeremy Mayer, Mountain View, CA (US)

(73) Assignee: ATIEVA, INC., Newark, CA (US)

( * ) Notice: Subject to any disclaimer, the term of this patent is extended or adjusted under 35 U.S.C. 154(b) by 12 days.

(21) Appl. No.: 16/253,629

(22) Filed: Jan. 22, 2019

(65) Prior Publication Data

US 2019/0173333 A1 Jun. 6, 2019

Related U.S. Application Data

(62) Division of application No. 15/422,209, filed on Feb. 1, 2017, now abandoned.

(60) Provisional application No. 62/293,317, filed on Feb. 9, 2016.

(51) Int. Cl.
*H02K 1/22* (2006.01)
*H02K 15/02* (2006.01)
*H02K 15/00* (2006.01)
*H02K 17/16* (2006.01)

(52) U.S. Cl.
CPC .......... *H02K 1/22* (2013.01); *H02K 15/0012* (2013.01); *H02K 15/02* (2013.01); *H02K 17/165* (2013.01)

(58) Field of Classification Search
CPC ...... H02K 1/22; H02K 15/0012; H02K 15/02; H02K 17/165
See application file for complete search history.

(56) References Cited

U.S. PATENT DOCUMENTS

| | | | |
|---|---|---|---|
| 1,936,244 A | * | 11/1933 | Bergstrom ......... H02K 15/0012 310/211 |
| 3,134,040 A | | 5/1964 | Barth |
| 4,792,713 A | | 12/1988 | Bush |
| 6,177,750 B1 | | 1/2001 | Tompkin |
| 6,441,532 B1 | * | 8/2002 | Ahrens ..................... H02K 1/26 310/211 |
| 2006/0273683 A1 | * | 12/2006 | Caprio ................. H02K 17/165 310/211 |
| 2012/0019091 A1 | | 1/2012 | Hong et al. |
| 2013/0127291 A1 | | 5/2013 | Agapiou et al. |
| 2013/0140937 A1 | | 6/2013 | Kim |
| 2014/0339950 A1 | | 11/2014 | Nelson et al. |

FOREIGN PATENT DOCUMENTS

| | | |
|---|---|---|
| CN | 201556981 | 8/2010 |
| DE | 8305232 | 4/1986 |
| JP | 2015035918 | 2/2015 |

* cited by examiner

*Primary Examiner* — Livius R. Cazan
(74) *Attorney, Agent, or Firm* — Patent Law Office of David G. Beck

(57) ABSTRACT

A rotor fabrication method is provided. The rotor uses pre-fabricated conductive rotor bars in which the ends have been shaped and sized to fit within corresponding end cap receptacles. After assembly, the structure is compressed, thereby achieving mechanical and electrical coupling between the conductive rotor bars and the end caps. Locking members disposed at either end of the assembly maintain the desired level of axial compressive force on the structure.

20 Claims, 16 Drawing Sheets

ROTOR ASSEMBLY MANUFACTURING TECHNIQUE

CROSS-REFERENCE TO RELATED APPLICATION

This application is a divisional of U.S. patent application Ser. No. 15/422,209, filed 1 Feb. 2017, which claims the benefit of U.S. Provisional Patent Application Ser. No. 62/293,317, filed Feb. 9, 2016, the disclosures of which are incorporated herein by reference for any and all purposes.

FIELD OF THE INVENTION

The present invention relates generally to an electric motor assembly and, more particularly, to an efficient rotor manufacturing technique.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, and cost.

In recent years, electric vehicles have proven to be not only environmentally friendly, but also capable of meeting, if not exceeding, consumer desires and expectations regarding performance. While early electric vehicles used DC motors in order to achieve the variable levels of speed and torque required to drive a vehicle, the advent of modern motor control systems utilizing direct torque control have allowed AC motors to deliver the same level of performance while providing the many benefits associated with AC motors including small size, low cost, high reliability and low maintenance.

A variety of techniques are currently used to manufacture the rotor assembly in an AC motor, these techniques offering a range of performance capabilities. Regardless of the manufacturing technique, in general the rotor assembly consists of a plurality of laminated discs that are combined to form a stack. The laminated discs within the stack include a plurality of peripherally spaced openings or slots. Passing through each set of openings or slots is a metal conductive bar, typically fabricated from either aluminum or copper. The openings or slots may be aligned so that the conductive bars are parallel to the axis of the rotor assembly, or they may be slightly skewed causing the conductive bars to be oblique to the axis of the rotor assembly. The conductive bars may either be cast in place or pre-fabricated and inserted into and through the stack of laminated discs. At either end of the rotor assembly is an end ring formed by mechanically and electrically joining together the ends of the conductive bars that extend beyond the stack. In a conventional rotor assembly, the conductive bars and the end rings are typically either brazed or electron-beam welded together.

An example of a conventional rotor assembly is provided in U.S. Pat. No. 4,064,410. As disclosed, the rotor assembly is formed by inserting a plurality of arcuately spaced apart conductive bars through a stack of laminated discs. The end rings, which are disposed at opposite ends of the stack, are welded to the protruding end portions of the bars.

While conventional rotor assemblies typically use end rings that are fabricated separately from the conductive bars, die casting techniques may be used to cast the conductive bars and the end rings in a single operation. For example, U.S. Pat. Nos. 2,607,969 and 2,991,518 disclose conventional and vacuum-assisted die casting techniques, respectively, used to cast rotor assemblies from a variety of conducting metals. However due to the higher melting temperature and the greater density of copper, the techniques disclosed in these patents are best applied to aluminum castings. U.S. Pat. No. 5,332,026 discloses an improvement in the casting system that is designed to compensate for some of the unusual problems associated with die casting copper, thereby allowing rotor cage electrical conductivity of 95% or greater to be achieved in a die cast rotor.

In order to decrease the electrical resistance associated with the end ring assemblies, U.S. Pat. No. 8,365,392 discloses a rotor assembly in which slugs are brazed between the end portions of the rotor bars, the braze joints contacting a large percentage of the rotor bar end portions. After each rotor bar/slug assembly is heated to form a plurality of braze joints, each of the two rotor bar/slug assemblies is machined to remove a circumferential edge portion. Then, in at least one embodiment, a containment ring is fit over the machined regions of each rotor bar/slug assembly.

While there are a variety of techniques that may be used to fabricate the rotor assembly of an electric vehicle's motor, there are trade-offs associated with each approach between manufacturing complexity and cost and the resultant rotor's electrical and mechanical characteristics. Accordingly, what is needed is a rotor manufacturing process that is both cost effective and capable of yielding a structurally robust rotor that exhibits excellent electrical characteristics. The present invention provides such a manufacturing process.

SUMMARY OF THE INVENTION

The present invention provides a method for fabricating a rotor assembly, the method including the steps of (i) assembling a lamination stack comprised of a plurality of lamination discs, where each of the lamination discs includes a central bore and a plurality of slots that are co-aligned within the lamination stack; (ii) inserting a plurality of conductive rotor bars into the plurality of slots corresponding to the lamination stack, where a first tapered end region of each of the plurality of conductive rotor bars extends beyond a first end surface of the lamination stack, and where a second tapered end region of each of the plurality of conductive rotor bars extends beyond a second end surface of the lamination stack; (iii) locating a rotor shaft within the central bore of the lamination stack; (iv) mounting a first end cap onto the rotor shaft and adjacent to the first end surface of the lamination stack, the first end cap including a first plurality of receptacles that correspond to the plurality of conductive rotor bars; (v) inserting the first end region of each conductive rotor bar into the corresponding receptacle of the first plurality of receptacles, where each receptacle of the first plurality of receptacles is mechanically and electrically coupled to the first end region of the corresponding conductive rotor bar; (vi) mounting a second end cap onto the rotor shaft and adjacent to the second end surface of the lamination stack, the second end cap including a second plurality of receptacles that correspond to the plurality of conductive rotor bars; (vii) inserting the second end region of each conductive rotor bar into the corresponding receptacle of the second plurality of receptacles, where each receptacle of the second plurality of receptacles is mechanically and electrically coupled to the second end region of the corresponding conductive rotor bar; (viii) mounting a first locking member onto the rotor shaft and adjacent to the first end cap, where the first locking member applies an axial compressive force on the first end cap in order to maintain the first end region of each conductive rotor bar within the corresponding receptacle of the first plurality of receptacles; and (ix) mounting a second locking member onto the rotor shaft and adjacent to the second end cap, where the second locking member applies an axial compressive force on the second end cap in order to maintain the second end region of each conductive rotor bar within the corresponding receptacle of the second plurality of receptacles. The method may include tapering at least two surfaces of the first end region and two surfaces of the second end region of each of the conductive rotor bars. The method may include arcuately shaping at least one surface of the first end region and one surface of the second end region of each of the conductive rotor bars. The plurality of conductive rotor bars may be fabricated from oxygen-free electrolytic (OFE) copper, non-OFE copper or aluminum. The first end cap and the second end cap may be fabricated from oxygen-free electrolytic (OFE) copper, non-OFE copper or aluminum.

In one aspect where the first plurality of receptacles extends completely through the first end cap and the second plurality of receptacles extends completely through the second end cap, the step of inserting the first end region of each conductive rotor bar into the corresponding receptacle of the first plurality of receptacles may further include the step of mechanically deforming and expanding a portion of the first end region of each of the plurality of conductive rotor bars within the corresponding receptacle of the first plurality of receptacles. Similarly, the step of inserting the second end region of each conductive rotor bar into the corresponding receptacle of the second plurality of receptacles may further include the step of mechanically deforming and expanding a portion of the second end region of each of the plurality of conductive rotor bars within the corresponding receptacle of the second plurality of receptacles.

In another aspect where the first plurality of receptacles extends completely through the first end cap and the second plurality of receptacles extends completely through the second end cap, the method may further include (i) welding the first end region of each conductive rotor bar into the corresponding receptacle of the first plurality of receptacles, and (ii) welding the second end region of each conductive rotor bar into the corresponding receptacle of the second plurality of receptacles.

In another aspect, the method may include (i) fabricating a first feature on each of the plurality of lamination discs as well as the first end cap and the second end cap, (ii) fabricating a second feature on the rotor shaft where the first feature is complementary to the second feature, and (iii) aligning the first feature of each of the plurality of lamination discs and the first end cap and the second end cap with the second feature of the rotor shaft, where the aligning step maintains alignment between each of the lamination discs, the first end cap and the second end cap.

In another aspect, the method may include (i) mounting a first spacer onto the rotor shaft and locating the first spacer between the first end surface of the stack and the first end cap, and (ii) mounting a second spacer onto the rotor shaft and locating the second spacer between the second end surface of the stack and the second end cap. The first and second spacers limit compressibility and deformation of the plurality of conductive rotor bars.

In another aspect, the method may include (i) fabricating a plurality of alignment holes within each of the plurality of lamination discs, and (ii) inserting a plurality of alignment locking pins through the lamination stack and through the plurality of alignment holes. Further, the method may include (i) inserting a first end portion of each of the plurality of alignment locking pins into a corresponding complementary end cap aperture of the first end cap, and (ii) inserting a second end portion of each of the plurality of alignment locking pins into a corresponding complementary end cap aperture of the second end cap.

In another aspect, the method may include (i) positioning a first disc spring between an outer end surface of the first end cap and the first locking member where the first disc spring maintains axial compressive force on the first end cap, and (ii) positioning a second disc spring between an outer end surface of the second end cap and the second locking member where the second disc spring maintains axial compressive force on the second end cap.

In another aspect, the method may include (i) machining the first end cap to remove a circumferential portion of the first end cap, where the machining step exposes a portion of the first end region of each of the plurality of conductive rotor bars, (ii) welding the portion of the first end region of each of the plurality of conductive rotor bars to the circumferential portion of the first end cap, (iii) machining the second end cap to remove a circumferential portion of the second end cap, where the machining step exposes a second portion of the second end region of each of the plurality of conductive rotor bars, and (iv) welding the second portion of the second end region of each of the plurality of conductive rotor bars to the circumferential portion of the second end cap. The method may further include (i) fitting a first containment ring around the first end cap, where the first containment ring encircles the portion of the first end region of each of the plurality of conductive rotor bars, and where the first containment ring is positioned where the first circumferential portion of the first end cap was removed during the machining step; and (ii) fitting a second containment ring around the second end cap, where the second containment ring encircles the portion of the second end region of each of the plurality of conductive rotor bars, and where the second containment ring is positioned where the second circumferential portion of the second end cap was removed during the machining step. The first and second containment rings may be fabricated from stainless steel, a beryllium copper alloy, or a metal matrix composite.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, similarly, a first step could be termed a second step, similarly, a first component could be termed a second component, all without departing from the scope of this disclosure.

Figure 1:
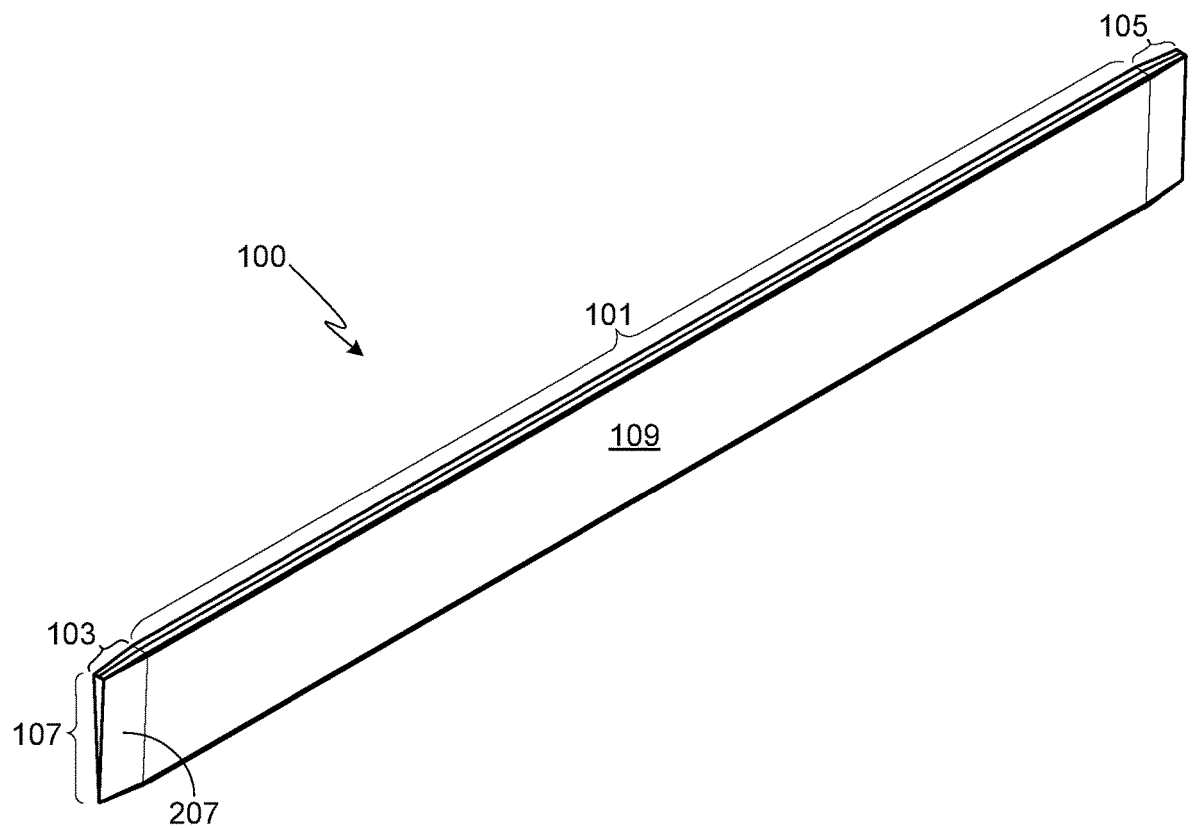
FIG. 1 provides a perspective view of a conductive bar according to at least one embodiment of the invention.
Figure 2:
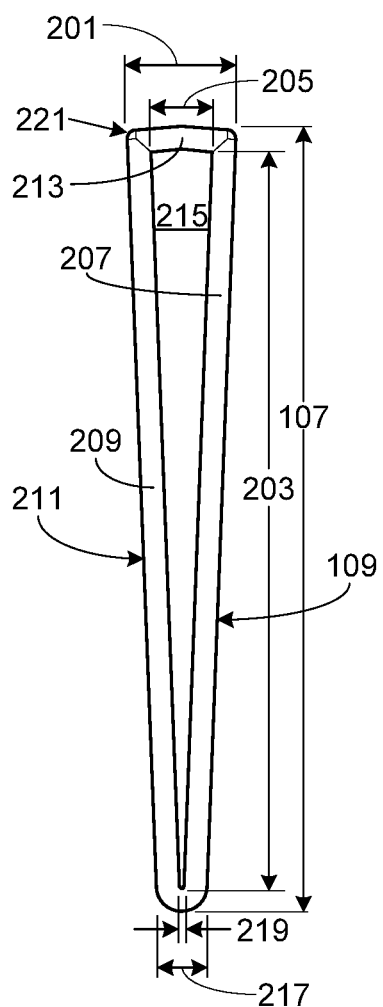
FIG. 2 provides an end view of the first end region of the conductive bar shown in FIG. 1.
Figure 3:
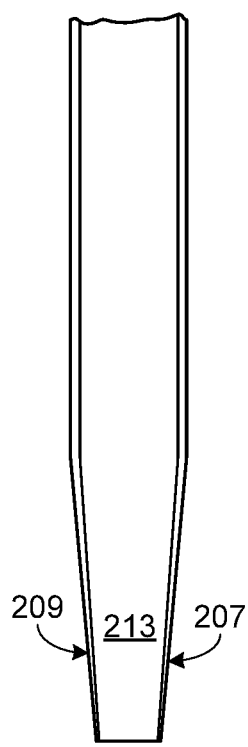
FIG. 3 provides a top view of the first end region of the conductive bar shown in FIG. 1.
Figure 4:
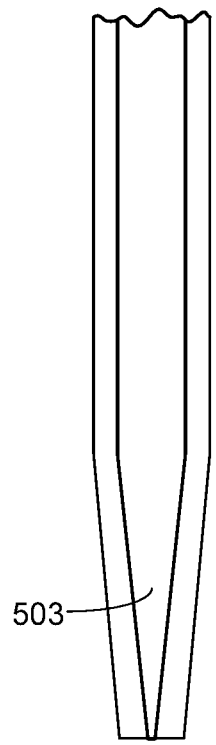
FIG. 4 provides a bottom view of the first end region of the conductive bar shown in FIG. 1.
Figure 5:
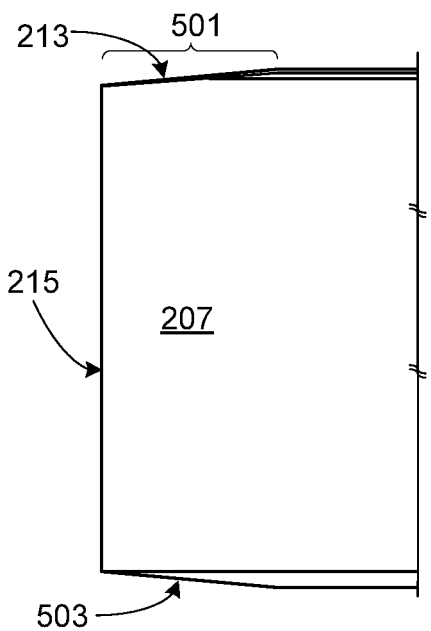
FIG. 5 provides a side view of the first end region of the conductive bar shown in FIG. 1.

FIG. 1 provides a perspective view according to at least one embodiment of the invention of a conductive rotor bar 100, also referred to herein as a conductive bar. Conductive bar 100 includes a central region 101, a first end region 103 and a second end region 105. Preferably the shape of end region 103 is the same as the shape of end region 105, thus simplifying manufacturing, although it should be understood that end regions 103 and 105 may be shaped differently from one another. FIGS. 2-5 provide end, top, bottom and side views, respectively, of a preferred configuration of end region 103 of conductive bar 100. In at least one preferred embodiment, bars 100 are approximately 200 to 220 millimeters long with a bar height 107 of between 10 and 25 millimeters. In the preferred embodiments and as shown (see, for example, FIGS. 1 and 2), the width of the conductive bar is tapered, with the bar having a maximum width 201 of between 2 and 15 millimeters. Preferably end regions 103 and 105 are approximately 3 to 10 millimeters long (dimension 501 shown in FIG. 5) with a final bar height 203 of between 8 and 23 millimeters and a final bar width 205, at the maximum, of between 2 and 13 millimeters.

Conductive bars 100 and the end caps described below are preferably fabricated from copper (e.g., oxygen-free electrolytic copper, also referred to as OFE or C10100 copper), although other materials may be used (e.g., non-OFE copper, aluminum, aluminum alloys, etc.). While the conductive bars and end caps are preferably fabricated from the same material, in at least one alternate preferred embodiment the conductive bars are fabricated from a first material (e.g., OFE copper) while the end caps are fabricated from a second material (e.g., aluminum). OFE copper, which has the highest purity for standardized copper, has a purity grade of 99.99% and due to its homogeneity, exhibits high thermal and electrical conductivity. Additionally, OFE copper is immune to hydrogen embrittlement. The use of OFE grade copper bars insures that the resultant rotor assembly is structurally much more robust than would be possible if the conductive bars were die cast, since die casting the bars would lead to the inclusion of a variety of material defects, imperfections, and impurities that can affect both rotor strength and performance.

In general, the end regions of each conductive bar 100 are tapered, thereby allowing a tight fit to be achieved between the ends of the conductive bars and the corresponding receptacles integrated into each end cap as described in detail below. The tapered end regions include multiple interface surfaces, the interface surfaces shaped to facilitate mechanical coupling during manufacturing, and to provide an effective physical and electrical connection between each conductive bar and the complimentary internal surfaces of the end cap receptacles (not shown in FIGS. 1-5) after rotor assembly.

As shown in the figures, end region 103 includes a first side surface 207 and a second side surface 209. Side surfaces 207 and 209 taper down, preferably at an angle of between 1 and 30 degrees, and more preferably between 2 and 10 degrees, from the corresponding sides 109 and 211 of central bar region 101. Additional surfaces of end region 103 may be tapered, thereby further facilitating the insertion of the conductive bars into the corresponding end caps while insuring a strong mechanical and electrical connection between the bars and the end caps. For example, in the illustrated embodiment top surface 213 of end region 103 is also tapered, preferably at an angle of between 1 and 30 degrees, and more preferably between 2 and 10 degrees, away from the plane that incorporates the top surface of the central region 109 of the conductive bar. Similarly, bottom surface 503 is preferably tapered, for example at an angle of between 1 and 30 degrees, and more preferably between 2 and 10 degrees, measured away from the plane that incorporates the lower surface of the central region 109 of the conductive bar.

Figure 6:
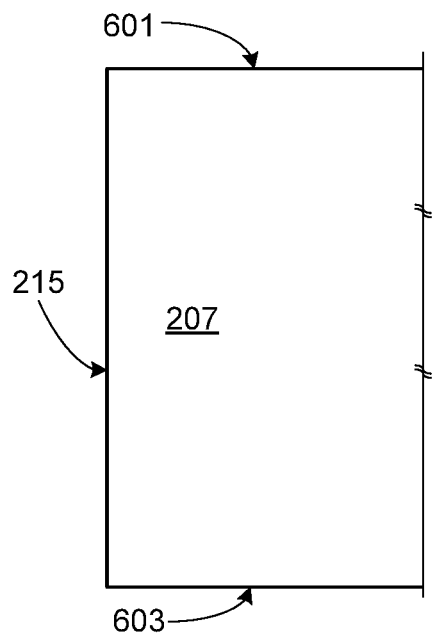
FIG. 6 provides a side view of the end region of the conductive bar of an alternate embodiment in which the side surfaces of the bar are tapered while the upper and lower surfaces of the bar remain un-tapered.
Figure 7:
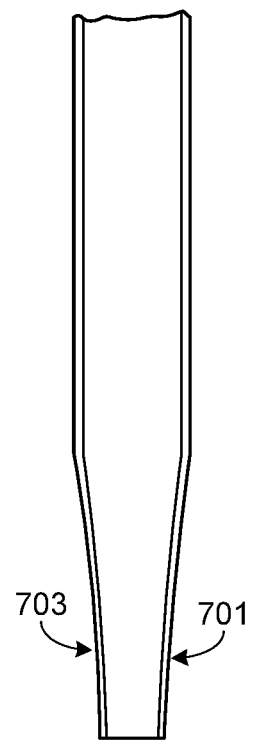
FIG. 7 provides a top view of the end region of the conductive bar of an alternate embodiment in which the side surfaces of the bar are both tapered and curved.

As noted above and illustrated in FIGS. 1-5, the end portions of conductive bar 100 are tapered inwards, thus decreasing the height of the conductive bar from the height 107 of central region 109 to the height 203 of end surface 215 of the end portion. Similarly, the width of conductive bar 100 decreases between the central region 109 and the end surface 215 of the end portion. Thus the maximum width of the conductive bar decreases from width 201 as measured for the central portion of the bar to width 205 as measured at surface 215. The width of the bottom of conductive bar 100 also decreases from a width of 217 as measured for the central portion 109 of the bar to a width 219 as measured at end surface 215. Preferably the transitions between adjacent surfaces are rounded (e.g., rounded edge 221). It should be understood that the shape of the end portions 103/105 of conductive bar 100 are only illustrative and that the inventors envision other shapes and configurations. For example, FIG. 6 provides a side view of an alternate configuration in which side surfaces 207 and 209 are tapered as shown in FIGS. 1-5, while upper surface 601 and lower surface 603 of the bar remain un-tapered as shown in FIG. 6. Additionally it should be understood that the tapered surfaces need not be flat. For example, FIG. 7 provides a top view of a conductive bar in which tapered surfaces 701 and 703 are arcuately shaped, where surfaces 701 and 703 correspond to surfaces 207 and 209 of the first embodiment. It will be appreciated that the end portions of the conductive bar may include various other combinations of tapered and un-tapered surfaces, as well as flat and arcuate surfaces.

Figure 8:
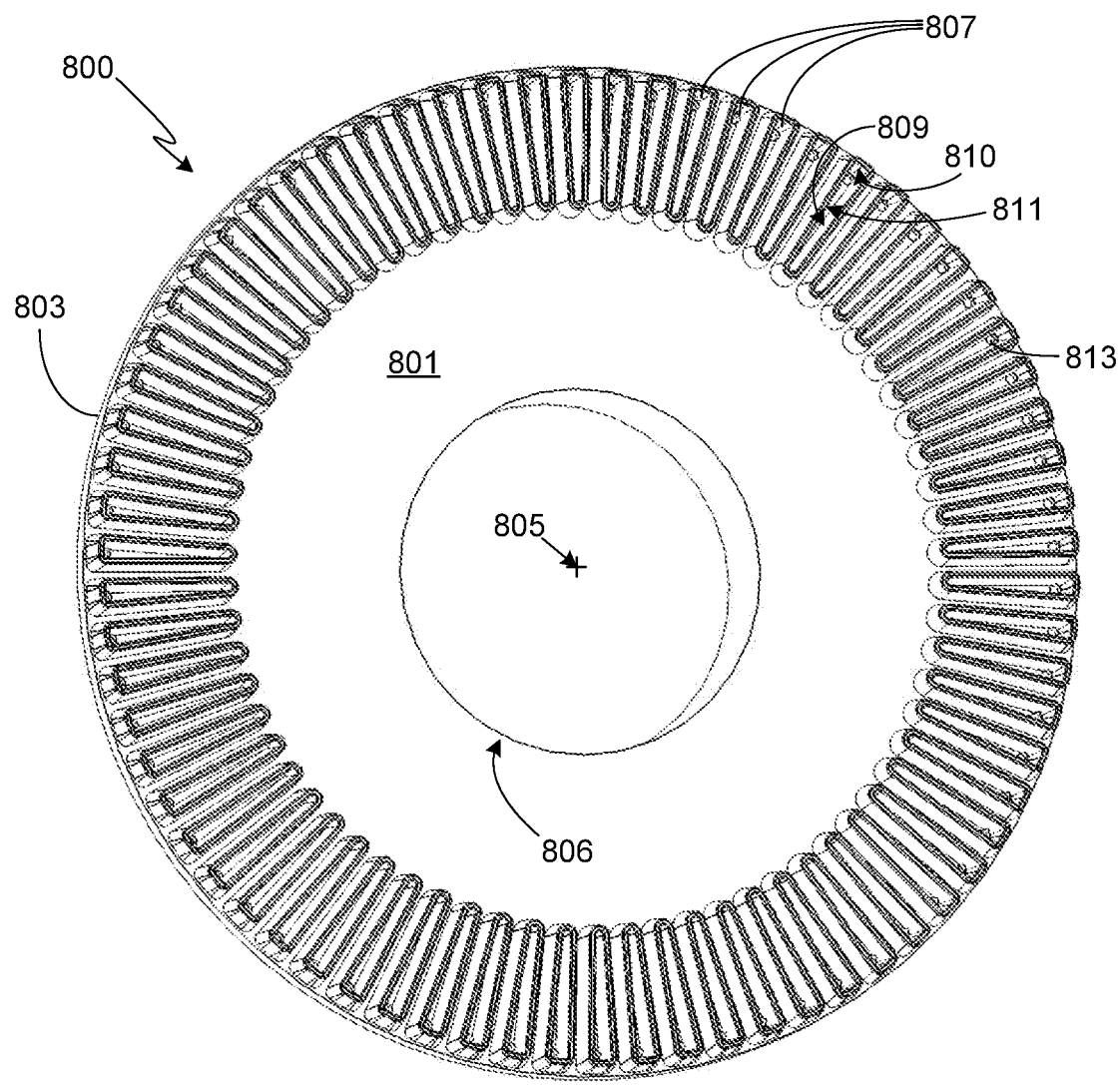
FIG. 8 provides a perspective view of the inner surface of an end cap configured for use with shaped conductive bars such as those shown in FIGS. 1-5.

FIG. 8 provides a perspective view of the inner surfaces of a preferred embodiment of an end cap 800 configured for use with shaped conductive bars such as those shown in FIGS. 1-5. Preferably end cap 800 is fabricated as a single piece, for example using a forging and machining manufacturing process, although it will be understood that other techniques (e.g., die casting) may be used to fabricate each end cap. End cap 800 is comprised of a disc. Both the inner surface 801 and the edge 803 of the disc are visible in FIG. 8. Located at the center of the end cap and co-aligned with the rotational axis 805 of the end cap is a hole 806 through which the rotor assembly's rotor shaft, not shown in this figure, is inserted. Extending inwardly away from inner surface 801 and towards the lamination stack, not shown in this figure, is a plurality of receptacles 807. Receptacles 807 are disposed radially about rotational axis 805. Each receptacle 807 is shaped to receive an end portion of a corresponding conductive bar, e.g., end portion 103 of conductive bar 100. The inner surfaces of each receptacle 807, e.g., surfaces 809-811, are shaped to insure that when the end portion of a corresponding conductive bar is inserted into the receptacle, the inner surfaces of the receptacle and the outer surfaces of the corresponding conductive bar end portion are both mechanically and electrically coupled together. Preferably a tight and rigid interference fit is achieved when the end portion of a conductive bar is inserted into the corresponding receptacle of the end cap.

In at least one embodiment, and as illustrated in FIG. 8, each receptacle 807 includes a small indentation 813 that is configured to accept a small amount, e.g., a ball, of solder. The solder material, which may be disposed at the end of each conductive bar, allows the conductive bars to be brazed to the end caps. Alternately and in at least one other embodiment, indentation 813 and the corresponding solder are omitted.

It should be understood that in some embodiments of the invention the surface roughness corresponding to the outer surfaces of the end regions of the conductive bars and the surface roughness corresponding to the inner surfaces of the receptacles of the end caps may be substantially the same. In yet other embodiments of the invention, the surface roughness corresponding to the outer surfaces of the end regions of the conductive bars and the surface roughness corresponding to the inner surfaces of the receptacles of the end caps may be different.

In at least one embodiment, the receptacles of the end caps are shaped such that all of the inner receptacle surfaces match the corresponding outer surfaces of the conductive bar end regions, thus maximizing surface area contact between the two structures when the conductive bars are inserted into the end cap. Alternately, one or more of the inner receptacle surfaces may have a slightly different size, taper angle or shape as compared to the corresponding outer conductive bar surface.

It will be appreciated that by making the end cap and/or conductive bars of a sufficiently soft material (e.g., OFE copper), and/or inserting the conductive bars into the corresponding receptacles with sufficient force, the inner surfaces of the receptacles and/or the outer surfaces of the end regions of the conductive bars may deform slightly, further enhancing both the structural and the electrical coupling of the conductive bars to the end caps.

Figure 9:
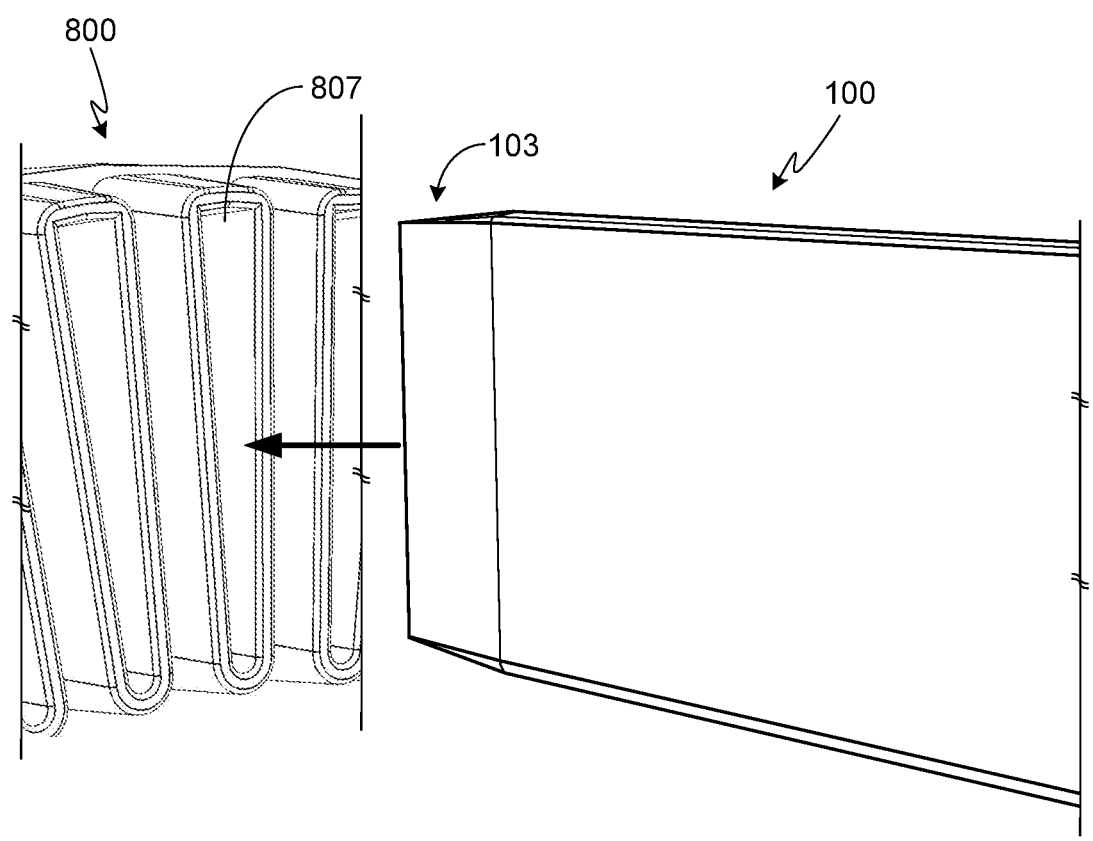
FIG. 9 illustrates the insertion of the end region of a conductive bar into a corresponding end cap receptacle.

FIG. 9 generally illustrates a portion of end cap 800 and a portion of conductive bar 100 and, more particularly, illustrates the insertion of end portion 103 of conductive bar 100 into receptacle 807 of end cap 800.

Figure 10:
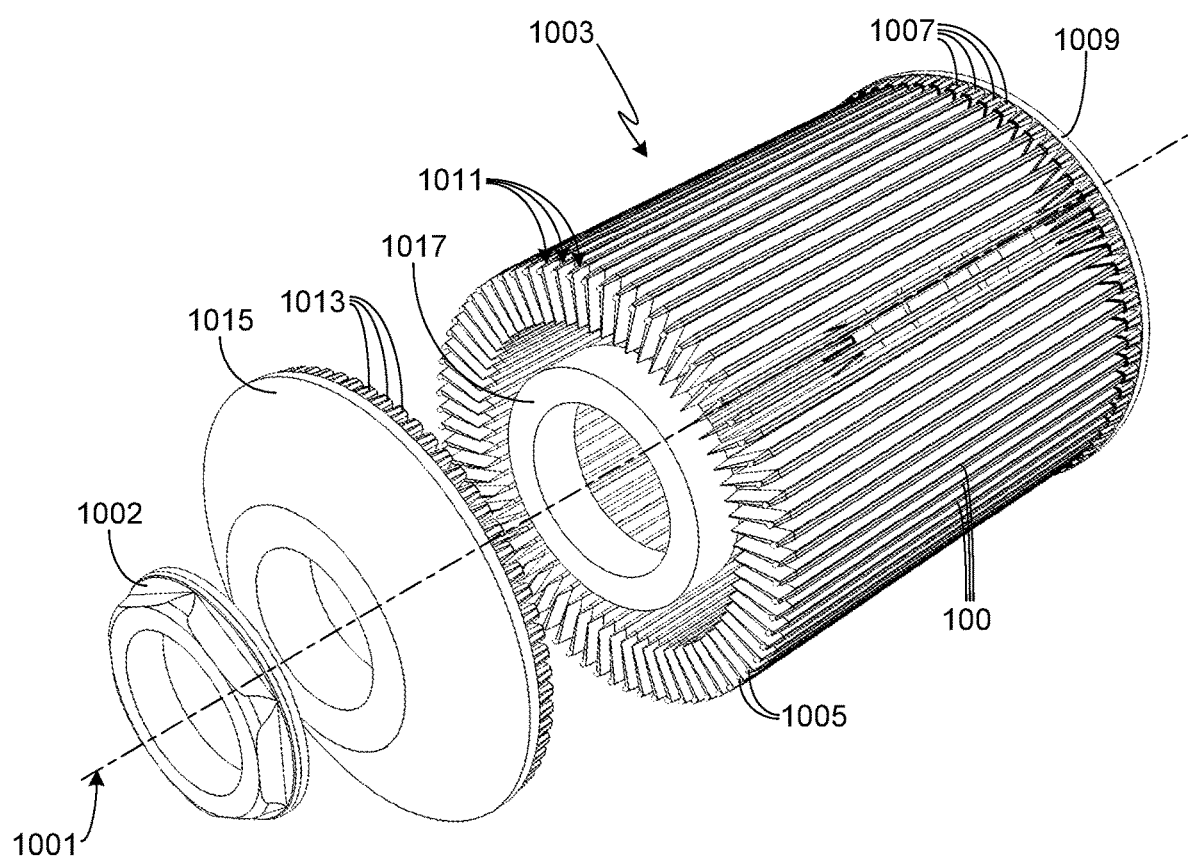
FIG. 10 provides a perspective view of a conductive bar and end cap assembly that includes a pair of locking members configured in accordance with a preferred embodiment of the invention.
Figure 11:
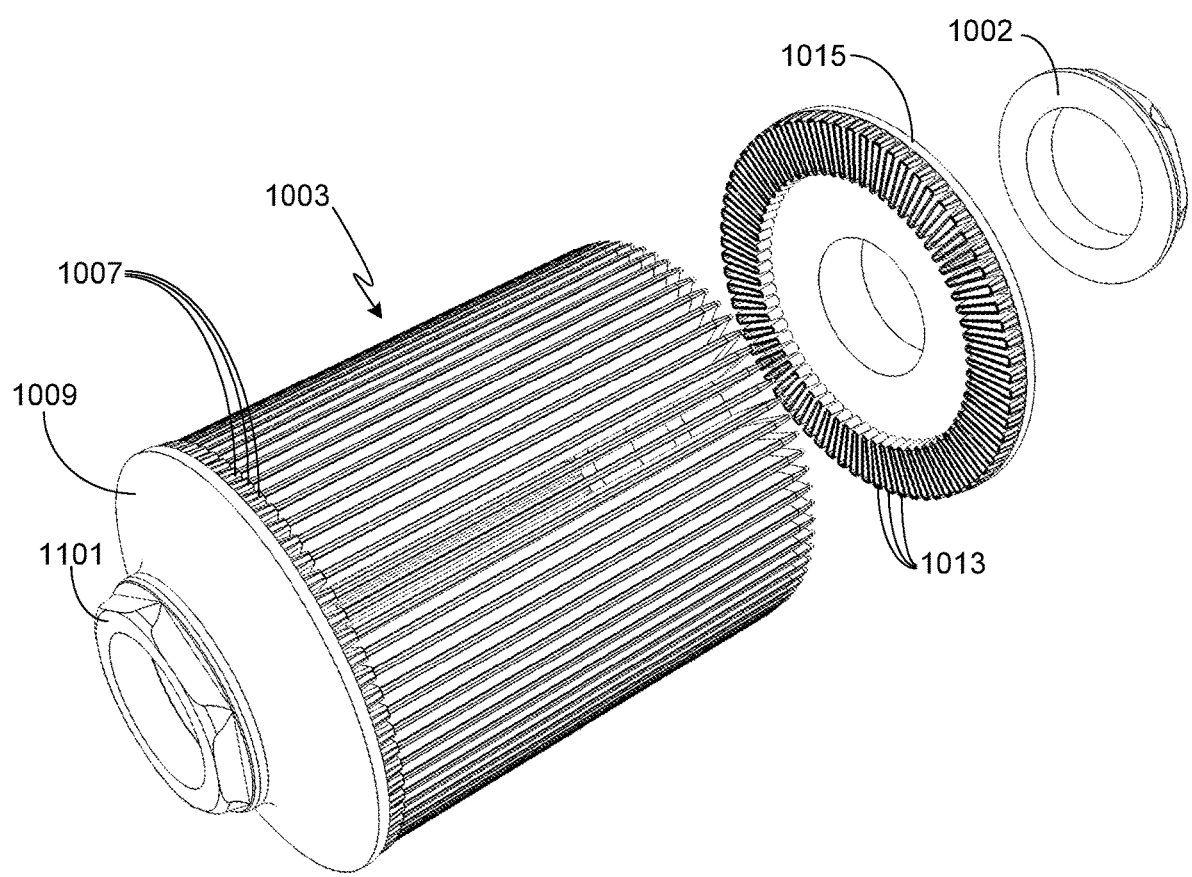
FIG. 11 provides a second perspective view of the conductive bar and end cap assembly shown in FIG. 10.
Figure 12:
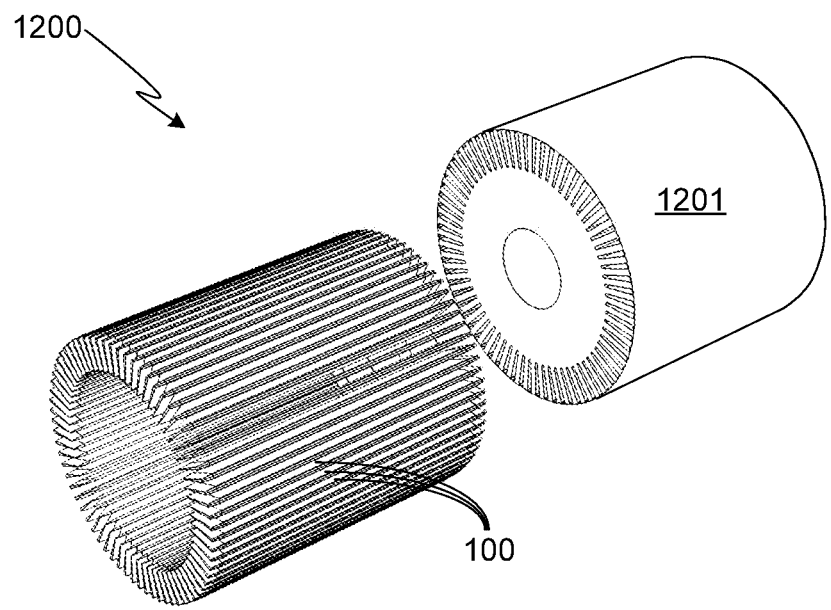
FIG. 12 provides an exploded view of a portion of a rotor assembly.
Figure 13:
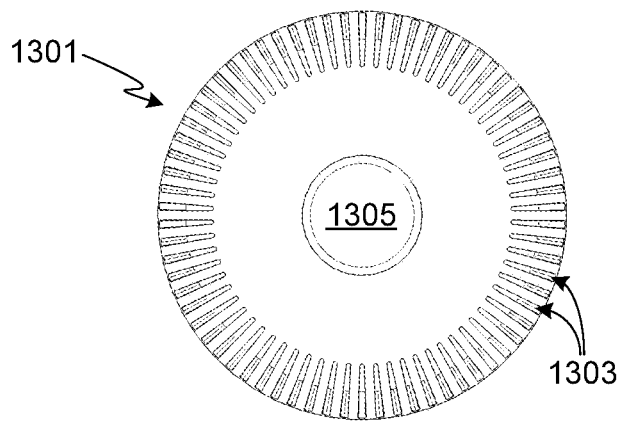
FIG. 13 provides an end view of a single lamination used in the formation of the lamination stack of the partial rotor assembly shown in FIG. 12.

FIGS. 10 and 11 provide two different perspective views of a conductive bar and end cap assembly oriented about rotational axis 1001, the two views taken from opposite ends of the same assembly. Illustrated in FIGS. 10 and 11 are locking members 1002 and 1101, respectively, the locking members as shown being configured in accordance with at least one embodiment of the invention. For clarity, these figures do not include a lamination stack as required for an operational rotor assembly, although a lamination stack is shown in FIGS. 12 and 13. The illustrated assembly includes a plurality 1003 of conductive bars 100. Each conductive bar 100 includes a ball of solder 1005 as described above relative to FIG. 8 and indentation 813. As previously noted, this solder is not required by the invention, albeit it is included in some embodiments.

In FIG. 10, a first end region of each of the conductive bars 100 comprising plurality 1003 has already been inserted into the corresponding receptacles 1007 of end cap 1009. At the other end of the assembly, the second end region 1011 of each conductive bar 100 is ready to be inserted into the corresponding receptacles 1013 of second end cap 1015. Locking member 1002 is configured to apply and/or maintain an axial force on the end caps, thereby insuring that the end regions of the conductive bars remain mechanically and electrically coupled to the end caps. In an assembly procedure in accordance with one embodiment, during fabrication of the rotor assembly a press (e.g., a hydraulic press) is used to apply sufficient force to the end caps (e.g., end caps 1009 and 1015) to cause the insertion of the conductive bar end regions into the corresponding receptacles of the end caps. Preferably sufficient force is applied to insure adequate mechanical and electrical coupling of the mating interface surfaces of the conductive bars and the end cap receptacles. In at least one assembly procedure, sufficient force is applied to provide partial deformation of the conductive bar end regions within the corresponding end cap receptacles. Locking member 1002 may be implemented to maintain the compressive force on the assembly after the manufacturing process has been completed and throughout the operational life of the rotor assembly. Locking member 1002 may be configured as a retaining nut or as any other structure that maintains axial pressure on the end caps and the conductive bars. The assembly may further include a spacer 1017. Although in the embodiment illustrated in FIGS. 10 and 11 locking members 1002 and 1101 are of the same design, it should be understood that the locking members located at either end of the assembly may be of different design and configuration.

FIG. 12 provides an exploded, perspective view of a partial rotor assembly 1200 and the primary components comprising the partial assembly. Note that this figure does not include the rotor shaft or the bearing assemblies. Rotor lamination stack 1201 of partial rotor assembly 1200 is comprised of a plurality of lamination discs 1301, with a selected stack length preferably somewhere within the range of 50 to 200 millimeters. Preferably the outer diameter of the rotor assembly is within the range of 100 to 150 millimeters.

FIG. 13 provides an end view of a single lamination disc 1301. Each disc 1301, which is preferably comprised of steel with a thickness selected to be within the range of 0.15 to 0.40 millimeters, may be fabricated using a stamping process or other technique. Preferably discs 1301 are coated, for example with an oxide, in order to electrically insulate the laminations from one another. Alternately, the metal discs comprising the stack may be electrically isolated from one another by the inclusion of an electrically insulating spacer disc located between adjacent metal discs.

In at least one preferred embodiment, the last disc located on either end of stack 1201 is thicker than the remaining discs in order to minimize the risk of damaging the stack during rotor assembly. Typically in this configuration the end lamination discs have a thickness selected to be within the range of 1.0 to 3.5 millimeters. The end discs may have lesser magnetic properties than the lamination discs, or may even be comprised of a non-magnetic material. The end discs may utilize the same slot size as that used in the remaining lamination discs, thus allowing the same tooling to be used to manufacture the slot pattern in both. Alternately, the slot size of the end discs may be slightly larger than slots 1303 in lamination discs 1301.

As noted above, each disc 1301 (or each disc 1301 and each interposed spacer disc if spacer discs are used) includes a plurality of slots 1303 through which conductive bars 100 are inserted. Slots 1303, all of which have substantially the same shape and dimensions, have a shape that is complementary to the cross-sectional shape of conductive bars 100. Preferably slots 1303 have an approximately rectangular shape. It will be appreciated that the rotor assembly fabrication technique of the present invention is not limited to a specific number of slots 1303, nor is it limited to a specific cross-sectional shape for bars 100/slots 1303, and that the number and shape of the bars and slots in the figures are only meant to illustrate, not limit, the invention.

Each disc 1301 (or each disc 1301 and each interposed spacer disc if spacer discs are used) may include one or more indentations (not shown) or other locating means that may be used to register each disc to the adjacent disc, thereby insuring proper alignment of slots 1303. Depending upon the desired rotor configuration, slots 1303 may align such that they extend axially through stack 1201, thus allowing each of the conductive bars 100 to be aligned in parallel with the rotor shaft. Alternately, slots 1303 may be slightly skewed, thereby causing the conductive bars 100 within the rotor assembly to be oblique to the axis of the rotor shaft. The center portion 1305 of each disc 1301 is removed, preferably by boring or via the disc stamping operation, thus providing an opening for the rotor shaft. In at least one preferred configuration, open center portion 1305 also includes a slot (not shown) that is sized to fit a key on the rotor shaft, thereby providing means for locating and positioning the rotor shaft within the stack.

Figure 14:
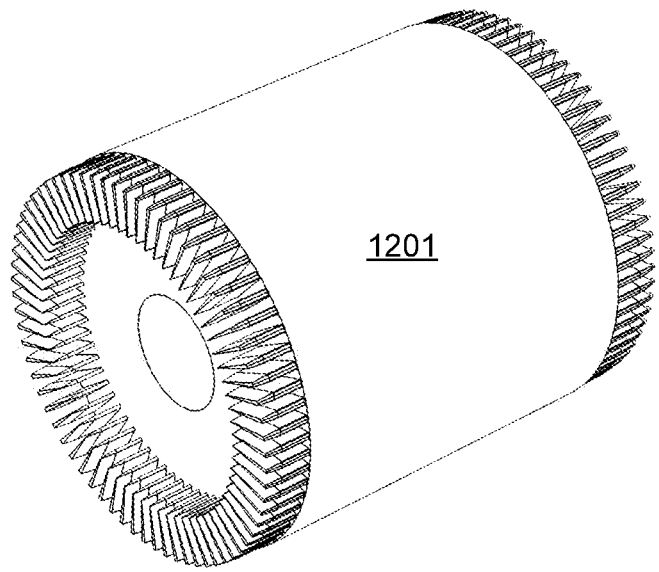
FIG. 14 provides a non-exploded, perspective view of the partial rotor assembly shown in FIG. 12.

FIG. 14 illustrates the partial rotor assembly of FIG. 12 after conductive bars 100 (i.e., rotor bars) have been inserted into slots 1303 of stack 1201.

Figure 15:
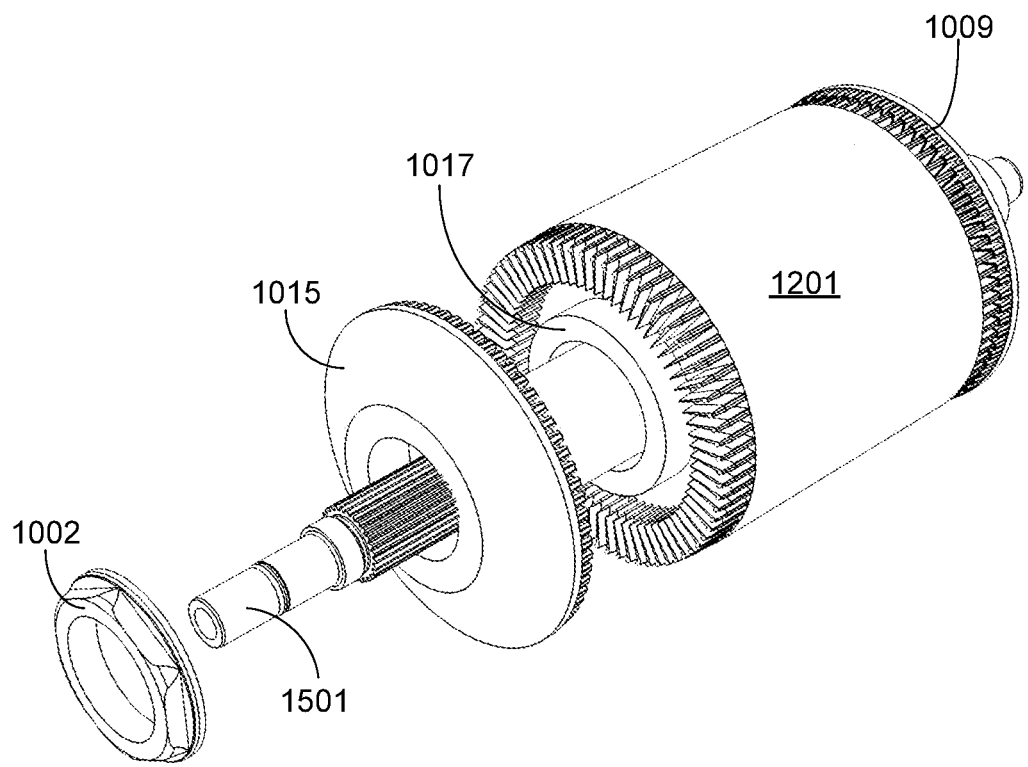
FIG. 15 provides a perspective view of the rotor assembly of FIG. 14 after insertion of the rotor shaft and partial assembly of the end caps.

FIG. 15 provides a perspective view of the partial rotor assembly of FIG. 14 after insertion of rotor shaft 1501. As in the assembly shown in FIG. 10, in the illustrated assembly the first end region of each of the conductive bars passing through stack 1201 has already been inserted into the corresponding receptacles of end cap 1009. At the other end of the assembly, the second end region of each conductive bar extending out of stack 1201 is ready to be inserted into the corresponding receptacles of second end cap 1015. Although not required by the invention, this embodiment includes spacer 1017. Spacer 1017 is disposed on rotor shaft 1501 between lamination stack 1201 and end cap 1015. Although not visible in this figure, preferably if spacers are used there is at least one spacer mounted at either end of the lamination stack and between the stack and the corresponding end cap. Spacer(s) 1017 may be used to control the level of compression and possible deformation when the end caps are pressed onto the respective end regions of the conductive bars. In some embodiments, spacer(s) 1017 is configured to provide a gap between the lamination stack and the corresponding end caps, thus reducing or negating the sharing load placed upon the conductive bars during, for example, thermal cycling of the assembly.

Figure 16:
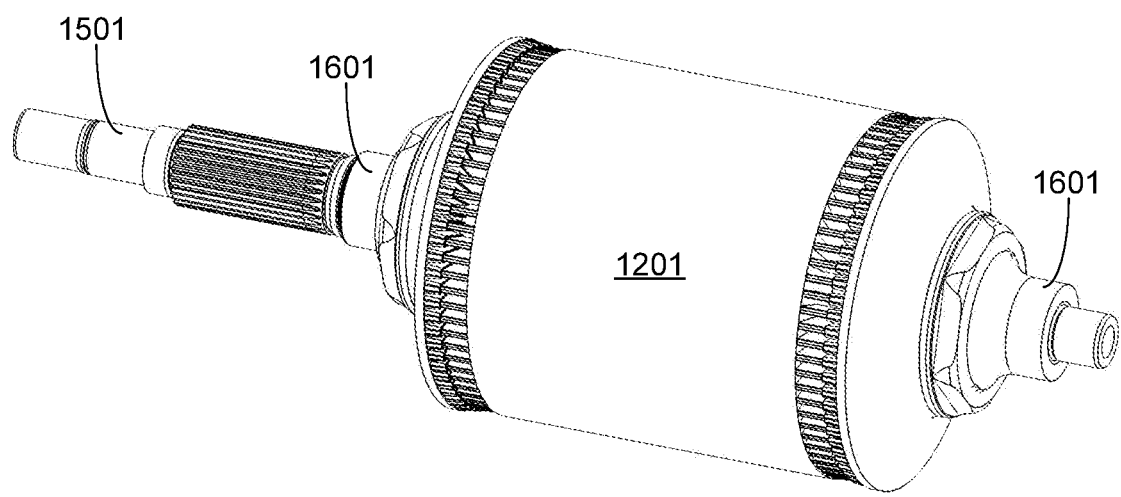
FIG. 16 provides a perspective view of the rotor after final assembly.

FIG. 16 provides a perspective view of the rotor after final assembly, including the mounting of bearing assemblies 1601 onto shaft 1501.

Figure 17:
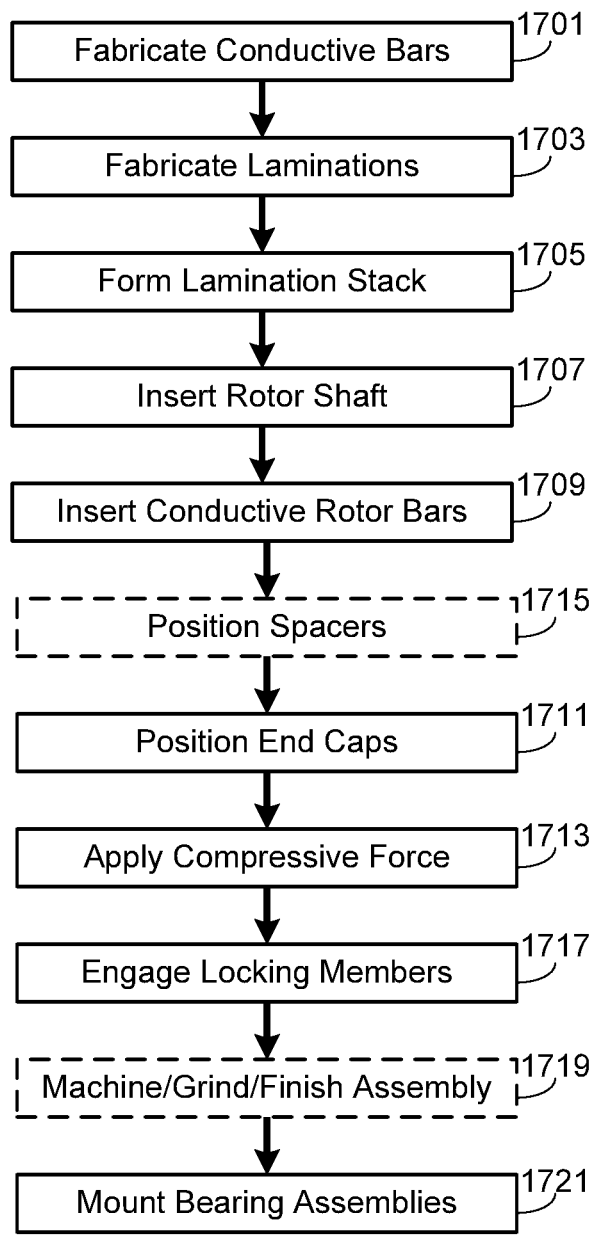
FIG. 17 provides a flow chart of the manufacturing process in accordance with a preferred embodiment of the invention.

FIG. 17 illustrates the primary steps associated with a preferred embodiment of the manufacturing process, the steps of which are described above in detail. Initially the conductive bars are fabricated (step 1701). Preferably the conductive bars are fabricated from OFE copper, although other materials may be used as previously noted. During the fabrication of the conductive bars, which typically uses a machining process, the end regions and the corresponding tapered surfaces are formed. In addition to fabricating the conductive bars, initially the laminations are also fabricated (step 1703) and assembled as a lamination stack (step 1705). Once the stack is assembled, the rotor shaft is inserted into the lamination stack (step 1707). Preferably the rotor shaft is securely coupled to the lamination stack by performing a shrink fitting treatment, for example by forming an interference fit between the shaft and the stack by heating and/or cooling the shaft and/or the stack. In at least one embodiment, the stack is heated to 350° C. prior to achieving this interference fit. Next, the conductive bars are inserted into the slots within the lamination stack (step 1709). In at least some process embodiments, the temperature of the stack is altered prior to insertion of the conductive bars (e.g., cooling the stack prior to bar insertion). Note that in at least one alternate embodiment, the conductive bars are inserted into the stack prior to the rotor shaft.

After the conductive bars and the rotor shaft have been inserted into the lamination stack, the end caps are placed into position (step 1711) and a press or similar technique is used to apply compressive force (e.g., up to 30 metric tons) to the assembly (step 1713). Step 1713 insures that the conductive bar end regions are properly seated within the end cap receptacles. To facilitate end cap mounting, the temperature of the conductive bars may be lowered and/or the temperature of the end caps may be raised. Note that in those embodiments in which spacers (e.g., spacers 1017) are incorporated into the assembly, the spacers are positioned (step 1715) prior to placing the end caps into position. As spacers may or may not be included in the assembly, step 1715 is shown in phantom.

Once the assembly has been compressed, thereby mechanically and electrically coupling the conductive bar end regions to the end cap receptacles, the locking members are positioned and locked into place (step 1717). If desired, the assembly (e.g., end caps) may be machined (optional step 1719) in order to optimize rotor assembly performance (e.g., balance). Lastly the bearing assemblies are mounted (step 1721).

While the configuration(s) described above is preferred, it will be appreciated that the inventors envision a variety of modifications that may be used to enhance rotor assembly performance in certain scenarios. For example, in some applications it may be desirable to provide additional means of locking the rotor assembly together, i.e., in addition to the end caps and the locking members.

Figure 18:
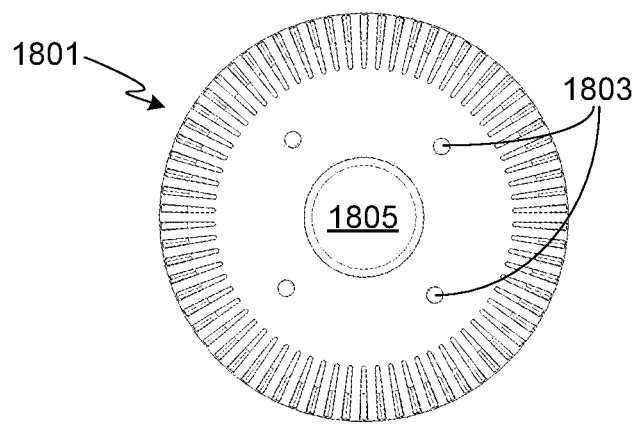
FIG. 18 provides an end view of a single lamination used in the formation of the lamination stack of an alternate embodiment.
Figure 19:
FIG. 19 provides a side view of a pin for use with a lamination stack comprised of laminates such as the disc shown in FIG. 18.
Figure 20:
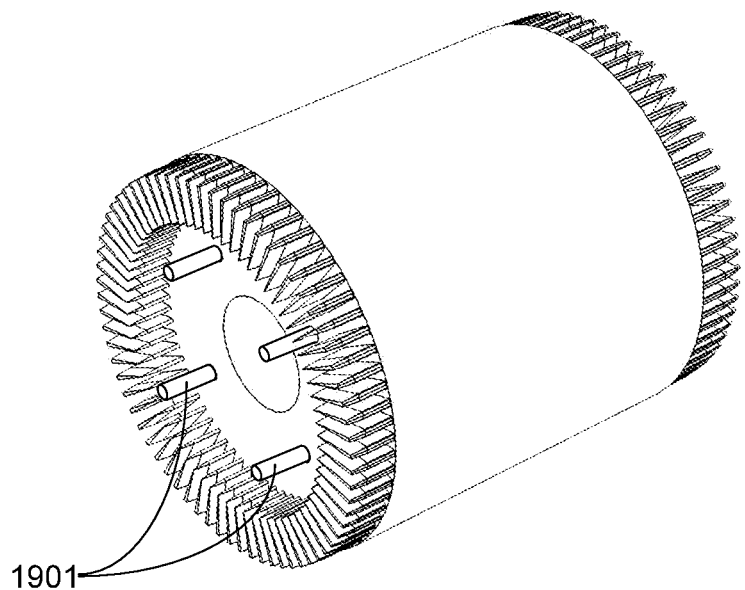
FIG. 20 provides a perspective view of a partial rotor assembly using the laminations shown in FIG. 18 along with the pins shown in FIG. 19.

FIGS. 18-20 illustrate a modification to the previously described embodiment(s). According to this modification, a plurality of locking pins is used to lock the end caps together, along with the lamination discs comprising the lamination stack, thereby insuring that the assembly does not twist, or otherwise become misaligned, during operation. FIG. 18 provides an end view of an alternate lamination disc 1801. This lamination is the same as previously described disc 1301, both in material and construction, except for the addition of a plurality of holes 1803 disposed radially about the central shaft opening (i.e., hole 1805). Although not required, preferably holes 1803 are equidistantly spaced about the center axis as shown.

During stack assembly, each individual hole 1803 within each lamination disc 1801 is aligned with the holes in the adjacent discs. Then an alignment locking pin 1901 (see, for example, FIG. 19) is inserted through the stack and through each set of aligned holes 1803. Each pin 1901 is preferably fabricated from copper or aluminum, although other materials (e.g., steel) may be used.

Although each pin 1901 may only extend through the lamination stack, thus helping to prevent the assembly from twisting and becoming misaligned, preferably each pin 1901 extends out and away from either end of the lamination stack as illustrated in FIG. 20. Then during rotor assembly, pins 1901 are inserted into complementary end cap apertures.

Figure 21:
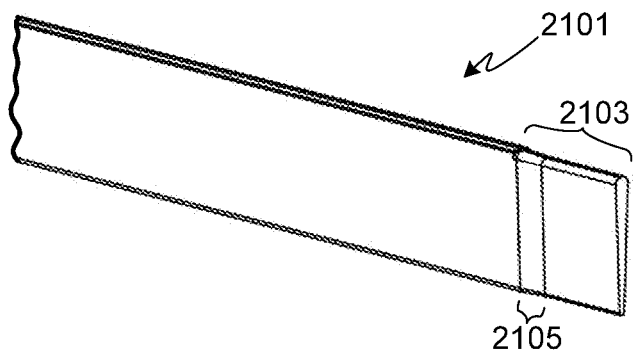
FIG. 21 provides a perspective view of a portion of a conductive bar in accordance with an alternate embodiment.
Figure 22:
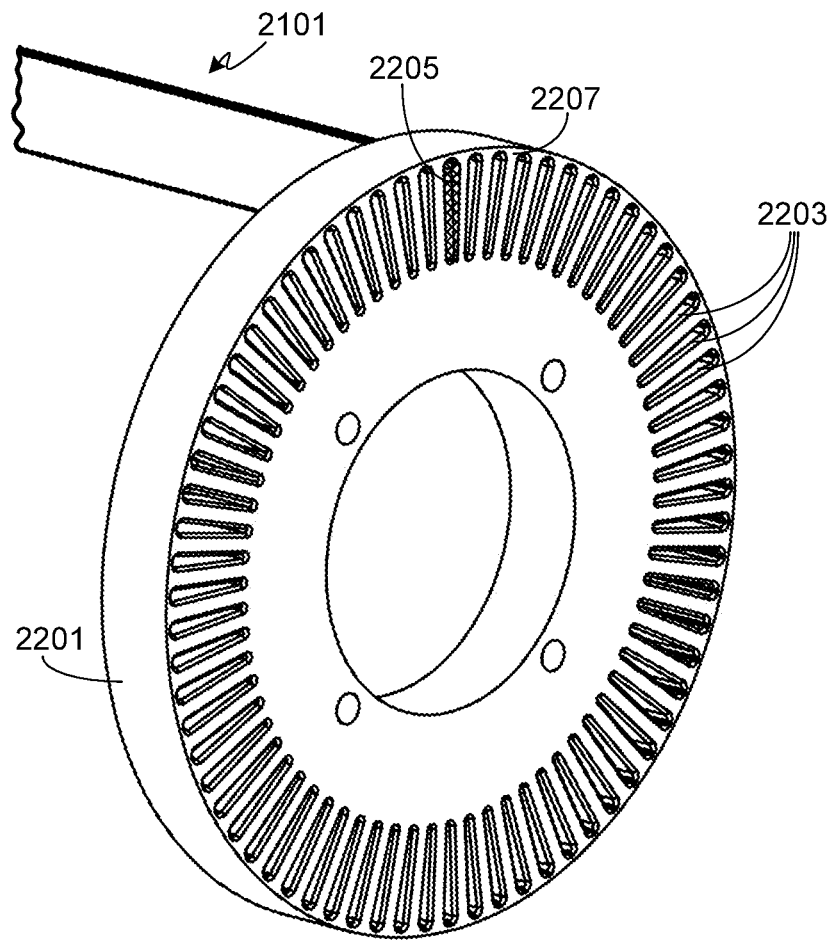
FIG. 22 provides a perspective view of an alternate end cap design configured to capture an end region of each conductive bar.
Figure 23:
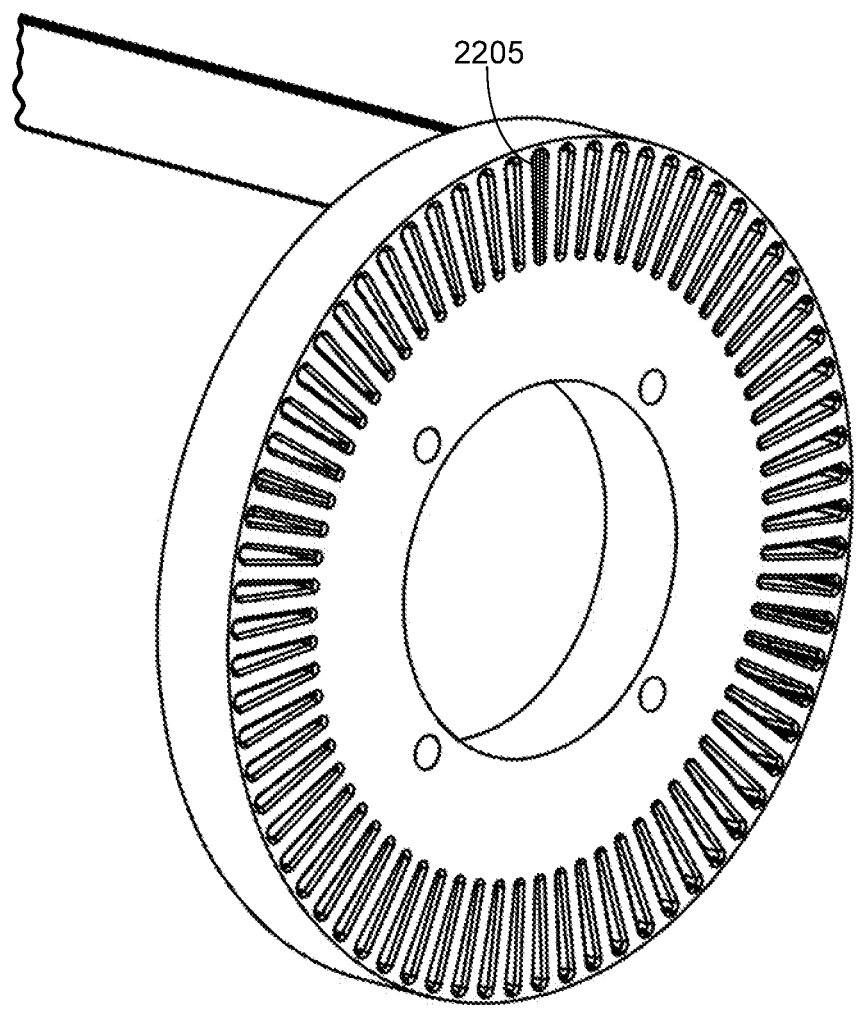
FIG. 23 provides the same view of the end cap shown in FIG. 22 after the end region of the conductive bar has been fully captured.

FIGS. 21-23 illustrate another modification of the preferred embodiment that is designed to radially lock the end caps together. In this embodiment, the end region of each conductive bar 2101 is designed to extend completely through the corresponding end cap (e.g., end cap 2201). Although the entire end region 2103 at either end of each conductive bar may be tapered, preferably only a portion 2105 is tapered as shown in FIG. 21. Tapering at least a portion of the conductive bar end region insures adequate mechanical and electrical coupling between the conductive bars and the end caps.

In this embodiment, the receptacles that are used to capture the conductive bar end rings pass completely through the end caps (see, for example, receptacles 2203 in end cap 2201 as illustrated in FIG. 22). Preferably the entire receptacle is contained between the front and rear surfaces of the end cap, as illustrated, although it should be understood that a portion of each conductive bar receptacle may extend away from one or both end cap surfaces in the same manner as the receptacles 807 in the embodiment shown in FIGS. 8 and 9 extend from the rear surface of end cap 800.

During assembly, the end region of each conductive bar is inserted into the corresponding end cap receptacle until the receptacle inner surfaces and the conductive bar outer surfaces mate. Once mated, a small portion 2205 (highlighted for clarity) of each conductive bar preferably extends out and away from the front end cap surface 2207 as shown. After the end regions of all of the conductive bars have been inserted into the corresponding end cap receptacles, end portion 2205 of each bar is permanently coupled to the corresponding end ring. Permanent coupling may be achieved by mechanically deforming end portion 2205 so that it expands within the outer portion of the corresponding receptacle 2203 and is permanently captured within that receptacle. Alternately, end portion 2205 of each conductive bar may be welded to the end cap, for example using laser welding techniques. FIG. 23 illustrates the end portion 2205 of a single, representative conductive bar permanently captured within a corresponding end cap receptacle.

Figure 24:
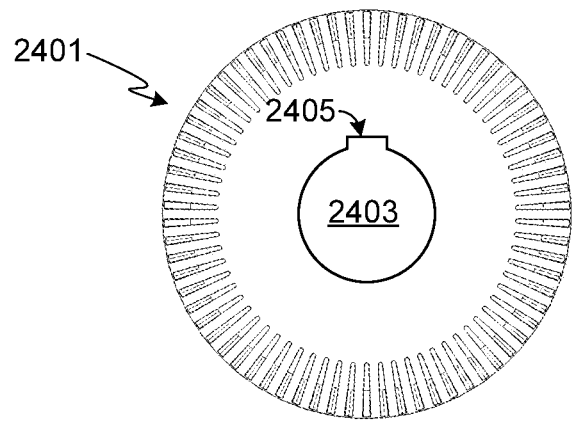
FIG. 24 provides an end view of a single lamination that is used to illustrate a keying feature that prevents misalignment of the end caps during motor operation.

Another approach that may be used to lock the end caps together is through the use of a keying feature. FIG. 24 illustrates a lamination disc 2401. In addition to the center portion 2403 being removed to provide an opening for the rotor shaft, a slot or other feature 2405 is also removed. Preferably feature 2405 is removed at the same time, and using the same process (e.g., stamping), as center portion 2403. Feature 2405 is sized to fit a complementary feature (e.g., a key) on the rotor shaft (e.g., shaft 1501). Each end cap also includes the same feature (e.g., feature 2405), thus insuring that the assembly remains locked together and does not become twisted or misaligned during operation.

Figure 25:
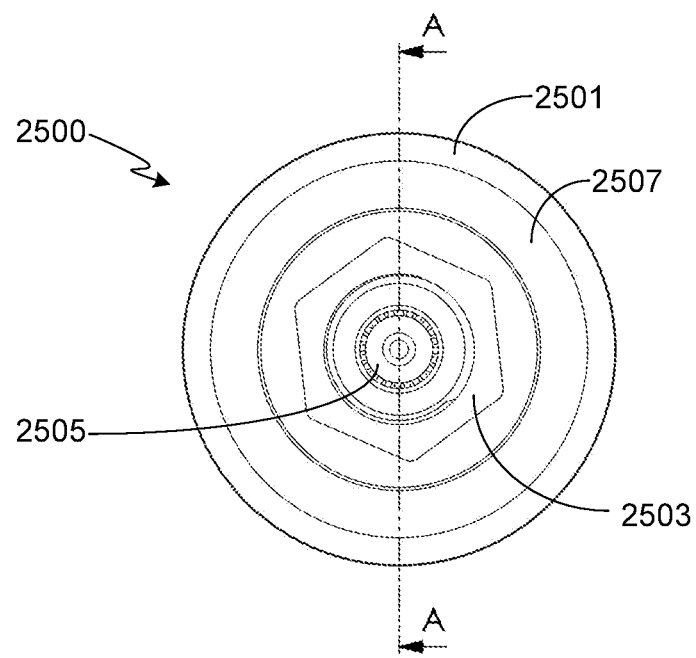
FIG. 25 provides an end view of an assembled rotor assembly.
Figure 26:
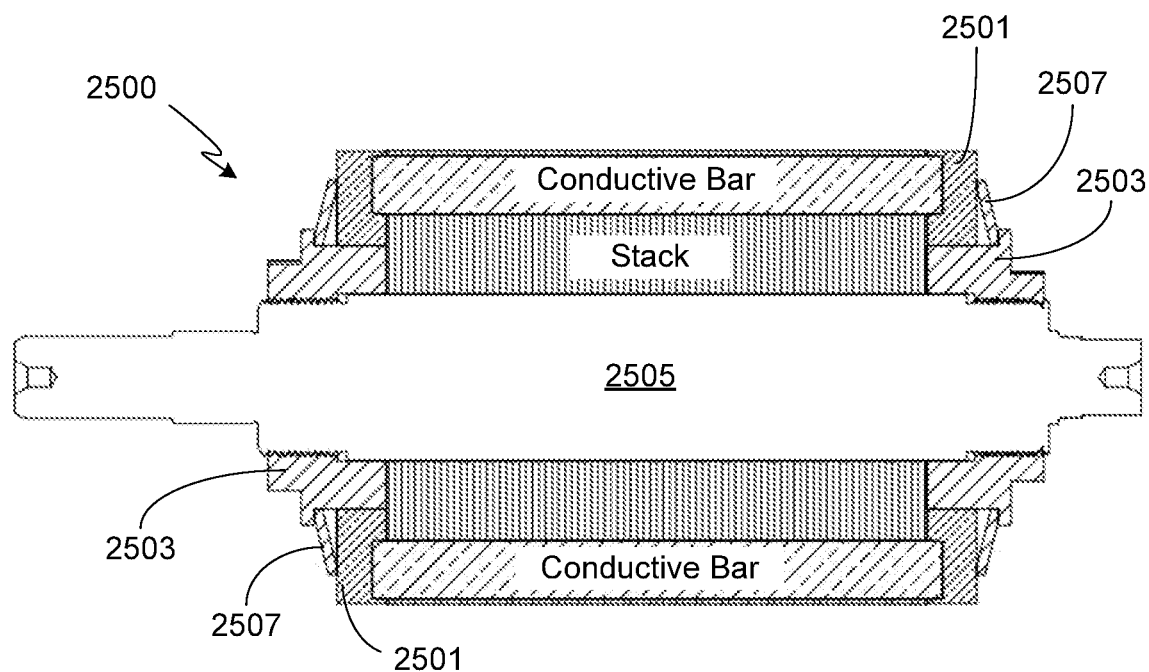
FIG. 26 provides a cross-sectional view of the rotor assembly shown in FIG. 25.

FIGS. 25 and 26 illustrate another modification of the preferred embodiment in which a pair of disc springs maintains compressive force on the end caps, and thus on the juncture of the conductive bars and the end caps, even as the rotor assembly undergoes thermal cycling during operation. Preferably, and as illustrated, the assembly utilizes conical disc springs (i.e., Belleville washers).

FIG. 25 provides an end view of a rotor assembly 2500. Visible from this view is the edge of end cap 2501, locking member 2503, and rotor shaft 2505. Also visible is the edge of spring washer 2507. The cross-sectional view provided in FIG. 26, taken along plane A-A, provides a clearer view of these structures. As shown, when the locking members 2503 are in place, disc washers 2507 apply the desired force on end caps 2501. In a preferred embodiment, disc washers 2507 apply between 5 and 15 metric tons on the end caps.

Figure 27:
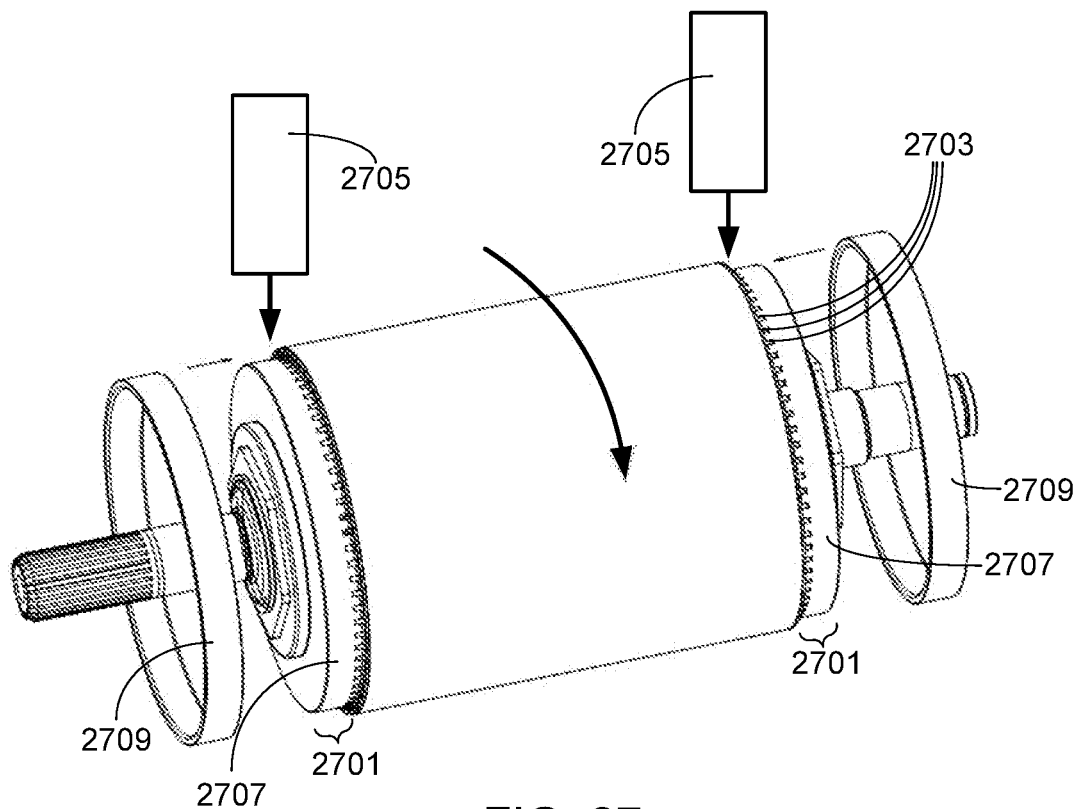
FIG. 27 illustrates the use of laser welding to lock the end caps to the conductive bars.

FIG. 27 illustrates another approach to locking the end caps together as well as limiting conductive bar movement relative to the end caps. According to this embodiment, after the end caps have been installed on the rotor assembly, a circumferential portion 2701 of each end cap is removed via a machining process. As shown, sufficient material is removed during this process to expose an end portion 2703 of each conductive bar. After the machining step, laser welders 2705 are used to weld the exposed end portions 2703 to the end caps 2707. If desired, containment rings 2709 may be fit over the machined portions of the end caps 2707. The containment rings 2709 may be held in place via an interference fit, or by soldering, welding or bonding the rings in place. Preferably the containment rings are fabricated from stainless steel, a beryllium copper alloy, or a metal matrix composite.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of fabricating a rotor assembly for an electric motor, comprising:
    assembling a lamination stack, wherein said lamination stack is comprised of a plurality of lamination discs, wherein each of said lamination discs is comprised of a plurality of slots, said plurality of slots of said plurality of lamination discs co-aligned within said lamination stack, and wherein each of said lamination discs is further comprised of a central bore;
    inserting a plurality of conductive rotor bars into said plurality of slots corresponding to said lamination stack, wherein a first end region of each of said plurality of conductive rotor bars extends beyond a first end surface of said lamination stack, and wherein a second end region of each of said plurality of conductive rotor bars extends beyond a second end surface of said lamination stack, and wherein said first end region and said second end region of each of said plurality of conductive rotor bars is tapered;
    locating a rotor shaft within said central bore of said lamination stack;
    mounting a first end cap onto said rotor shaft and adjacent to said first end surface of said lamination stack, said first end cap comprising a first plurality of receptacles corresponding to said plurality of conductive rotor bars;
    inserting said first end region of each conductive rotor bar of said plurality of conductive rotor bars into a corresponding receptacle of said first plurality of receptacles, wherein each receptacle of said first plurality of receptacles is mechanically and electrically coupled to said first end region of each corresponding conductive rotor bar of said plurality of conductive rotor bars;
    mounting a second end cap onto said rotor shaft and adjacent to said second end surface of said lamination stack, said second end cap comprising a second plurality of receptacles corresponding to said plurality of conductive rotor bars;
    inserting said second end region of each conductive rotor bar of said plurality of conductive rotor bars into a corresponding receptacle of said second plurality of receptacles, wherein each receptacle of said second plurality of receptacles is mechanically and electrically coupled to said second end region of each corresponding conductive rotor bar of said plurality of conductive rotor bars;
    mounting a first disc spring onto said rotor shaft and adjacent to an outer end surface of said first end cap;
    mounting a second disc spring onto said rotor shaft and adjacent to an outer end surface of said second end cap;
    mounting a first locking member onto said rotor shaft, wherein said first disc spring is positioned between said outer end surface of said first end cap and said first locking member, wherein said first locking member applies a first axial compressive force on said first end cap to maintain said first end region of each conductive rotor bar of said plurality of conductive rotor bars within each corresponding receptacle of said first plurality of receptacles, and wherein said first disc spring maintains said first axial compressive force on said first end cap; and
    mounting a second locking member onto said rotor shaft, wherein said second disc spring is positioned between said outer end surface of said second end cap and said second locking member, wherein said second locking member applies a second axial compressive force on said second end cap to maintain said second end region of each conductive rotor bar of said plurality of conductive rotor bars within each corresponding receptacle of said second plurality of receptacles, and wherein said second disc spring maintains said second axial compressive force on said second end cap.

2. The method of claim 1, further comprising:
    tapering at least two surfaces of said first end region of each of said plurality of conductive rotor bars; and
    tapering at least two surfaces of said second end region of each of said plurality of conductive rotor bars.

3. The method of claim 1, further comprising:
    arcuately shaping at least one surface of said first end region of each of said plurality of conductive rotor bars; and
    arcuately shaping at least one surface of said second end region of each of said plurality of conductive rotor bars.

4. The method of claim 1, said first plurality of receptacles extending completely through said first end cap and said second plurality of receptacles extending completely through said second end cap, wherein said step of inserting said first end region of each conductive rotor bar of said plurality of conductive rotor bars into said corresponding receptacle of said first plurality of receptacles further comprises mechanically deforming and expanding a first portion of said first end region of each of said plurality of conductive rotor bars within each corresponding receptacle of said first plurality of receptacles, and wherein said step of inserting said second end region of each conductive rotor bar of said plurality of conductive rotor bars into said corresponding receptacle of said second plurality of receptacles further comprises mechanically deforming and expanding a second portion of said second end region of each of said plurality of conductive rotor bars within each corresponding receptacle of said second plurality of receptacles.

5. The method of claim 1, said first plurality of receptacles extending completely through said first end cap and said second plurality of receptacles extending completely through said second end cap, the method further comprising:
   welding said first end region of each conductive rotor bar of said plurality of conductive rotor bars into said corresponding receptacle of said first plurality of receptacles; and
   welding said second end region of each conductive rotor bar of said plurality of conductive rotor bars into said corresponding receptacle of said second plurality of receptacles.

6. The method of claim 1, further comprising:
   fabricating a first feature on each of said plurality of lamination discs and said first end cap and said second end cap;
   fabricating a second feature on said rotor shaft, wherein said first feature is complementary to said second feature; and
   aligning said first feature of each of said plurality of lamination discs and said first end cap and said second end cap with said second feature of said rotor shaft, wherein said aligning step maintains alignment between each of said plurality of lamination discs, said first end cap and said second end cap.

7. The method of claim 1, further comprising:
   mounting a first spacer onto said rotor shaft and locating said first spacer between said first end surface of said stack and said first end cap; and
   mounting a second spacer onto said rotor shaft and locating said second spacer between said second end surface of said stack and said second end cap, wherein said first spacer and said second spacer limit compressibility and deformation of said plurality of conductive rotor bars.

8. The method of claim 1, further comprising:
   fabricating a plurality of alignment holes within each of said plurality of lamination discs; and
   inserting a plurality of alignment locking pins through said lamination stack and through said plurality of alignment holes.

9. The method of claim 8, further comprising:
   inserting a first end portion of each of said plurality of alignment locking pins into a corresponding complementary end cap aperture of said first end cap; and
   inserting a second end portion of each of said plurality of alignment locking pins into a corresponding complementary end cap aperture of said second end cap.

10. The method of claim 1, further comprising fabricating said plurality of conductive rotor bars from a material selected from the group consisting of oxygen-free electrolytic (OFE) copper, non-OFE copper and aluminum.

11. The method of claim 1, further comprising fabricating said first end cap and said second end cap from a material selected from the group consisting of oxygen-free electrolytic (OFE) copper, non-OFE copper and aluminum.

12. A The method of fabricating a rotor assembly for an electric motor, comprising:
   assembling a lamination stack, wherein said lamination stack is comprised of a plurality of lamination discs, wherein each of said lamination discs is comprised of a plurality of slots, said plurality of slots of said plurality of lamination discs co-aligned within said lamination stack, and wherein each of said lamination discs is further comprised of a central bore;
   inserting a plurality of conductive rotor bars into said plurality of slots corresponding to said lamination stack, wherein a first end region of each of said plurality of conductive rotor bars extends beyond a first end surface of said lamination stack, and wherein a second end region of each of said plurality of conductive rotor bars extends beyond a second end surface of said lamination stack, and wherein said first end region and said second end region of each of said plurality of conductive rotor bars is tapered;
   locating a rotor shaft within said central bore of said lamination stack;
   mounting a first end cap onto said rotor shaft and adjacent to said first end surface of said lamination stack, said first end cap comprising a first plurality of receptacles corresponding to said plurality of conductive rotor bars;
   inserting said first end region of each conductive rotor bar of said plurality of conductive rotor bars into a corresponding receptacle of said first plurality of receptacles, wherein each receptacle of said first plurality of receptacles is mechanically and electrically coupled to said first end region of each corresponding conductive rotor bar of said plurality of conductive rotor bars;
   mounting a second end cap onto said rotor shaft and adjacent to said second end surface of said lamination stack, said second end cap comprising a second plurality of receptacles corresponding to said plurality of conductive rotor bars;
   inserting said second end region of each conductive rotor bar of said plurality of conductive rotor bars into a corresponding receptacle of said second plurality of receptacles, wherein each receptacle of said second plurality of receptacles is mechanically and electrically coupled to said second end region of each corresponding conductive rotor bar of said plurality of conductive rotor bars;
   mounting a first locking member onto said rotor shaft and adjacent to said first end cap, wherein said first locking member applies a first axial compressive force on said first end cap to maintain said first end region of each conductive rotor bar of said plurality of conductive rotor bars within each corresponding receptacle of said first plurality of receptacles;
   mounting a second locking member onto said rotor shaft and adjacent to said second end cap, wherein said second locking member applies a second axial compressive force on said second end cap to maintain said second end region of each conductive rotor bar of said plurality of conductive rotor bars within each corresponding receptacle of said second plurality of receptacles;
   machining said first end cap to remove a first circumferential portion of said first end cap, wherein said step of machining said first end cap exposes a first portion of said first end region of each of said plurality of conductive rotor bars;
   welding said first portion of said first end region of each of said plurality of conductive rotor bars to said first circumferential portion of said first end cap;
   machining said second end cap to remove a second circumferential portion of said second end cap, wherein said step of machining said second end cap exposes a second portion of said second end region of each of said plurality of conductive rotor bars; and welding said second portion of said second end region of each of said plurality of conductive rotor bars to said second circumferential portion of said second end cap.

13. The method of claim 12, further comprising:

fitting a first containment ring around said first end cap, wherein said first containment ring encircles said first portion of said first end region of each of said plurality of conductive rotor bars, and wherein said first containment ring is positioned where said first circumferential portion of said first end cap was removed during said step of machining said first end cap; and fitting a second containment ring around said second end cap, wherein said second containment ring encircles said second portion of said second end region of each of said plurality of conductive rotor bars, and wherein said second containment ring is positioned where said second circumferential portion of said second end cap was removed during said step of machining said second end cap.

14. The method of claim 13, further comprising fabricating said first containment ring and said second containment ring from a material selected from the group consisting of a stainless steel, a beryllium copper alloy, or a metal matrix composite.

15. The method of claim 12, further comprising:

tapering at least two surfaces of said first end region of each of said plurality of conductive rotor bars; and tapering at least two surfaces of said second end region of each of said plurality of conductive rotor bars.

16. The method of claim 12, further comprising:

arcuately shaping at least one surface of said first end region of each of said plurality of conductive rotor bars; and arcuately shaping at least one surface of said second end region of each of said plurality of conductive rotor bars.

17. The method of claim 12, said first plurality of receptacles extending completely through said first end cap and said second plurality of receptacles extending completely through said second end cap, wherein said step of inserting said first end region of each conductive rotor bar of said plurality of conductive rotor bars into said corresponding receptacle of said first plurality of receptacles further comprises mechanically deforming and expanding a first portion of said first end region of each of said plurality of conductive rotor bars within each corresponding receptacle of said first plurality of receptacles, and wherein said step of inserting said second end region of each conductive rotor bar of said plurality of conductive rotor bars into said corresponding receptacle of said second plurality of receptacles further comprises mechanically deforming and expanding a second portion of said second end region of each of said plurality of conductive rotor bars within each corresponding receptacle of said second plurality of receptacles.

18. The method of claim 12, said first plurality of receptacles extending completely through said first end cap and said second plurality of receptacles extending completely through said second end cap, the method further comprising:

welding said first end region of each conductive rotor bar of said plurality of conductive rotor bars into said corresponding receptacle of said first plurality of receptacles; and welding said second end region of each conductive rotor bar of said plurality of conductive rotor bars into said corresponding receptacle of said second plurality of receptacles.

19. The method of claim 12, further comprising:

fabricating a first feature on each of said plurality of lamination discs and said first end cap and said second end cap;

fabricating a second feature on said rotor shaft, wherein said first feature is complementary to said second feature; and aligning said first feature of each of said plurality of lamination discs and said first end cap and said second end cap with said second feature of said rotor shaft, wherein said aligning step maintains alignment between each of said plurality of lamination discs, said first end cap and said second end cap.

20. The method of claim 12, further comprising:

fabricating a plurality of alignment holes within each of said plurality of lamination discs;

inserting a plurality of alignment locking pins through said lamination stack and through said plurality of alignment holes;

inserting a first end portion of each of said plurality of alignment locking pins into a corresponding complementary end cap aperture of said first end cap; and inserting a second end portion of each of said plurality of alignment locking pins into a corresponding complementary end cap aperture of said second end cap.

* * * * *